(12) United States Patent
Stutch et al.

(10) Patent No.: US 12,531,836 B2
(45) Date of Patent: *Jan. 20, 2026

(54) PRIVATE APPLICATION PLATFORM

(71) Applicants: Robert Harry Stutch, San Francisco, CA (US); Sara Duryea, Oakland, CA (US); Joshua David Wynd, Berkeley, CA (US)

(72) Inventors: Robert Harry Stutch, San Francisco, CA (US); Sara Duryea, Oakland, CA (US); Joshua David Wynd, Berkeley, CA (US)

(73) Assignee: Circle Security AI, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,113

(22) Filed: Oct. 11, 2023

(65) Prior Publication Data

US 2024/0080303 A1    Mar. 7, 2024

Related U.S. Application Data

(63) Continuation of application No. 15/433,999, filed on Feb. 15, 2017, now Pat. No. 11,924,171, which is a continuation of application No. 15/051,626, filed on Feb. 23, 2016, now Pat. No. 9,608,964.

(60) Provisional application No. 62/133,972, filed on Mar. 16, 2015, provisional application No. 62/119,792, filed on Feb. 23, 2015.

(51) Int. Cl.
  *H04L 9/40* (2022.01)
  *H04L 51/216* (2022.01)
  *H04L 67/141* (2022.01)

(52) U.S. Cl.
  CPC .......... *H04L 63/029* (2013.01); *H04L 51/216* (2022.05); *H04L 63/0272* (2013.01); *H04L 63/0428* (2013.01); *H04L 63/10* (2013.01); *H04L 63/102* (2013.01); *H04L 63/105* (2013.01); *H04L 67/141* (2013.01); *H04L 63/166* (2013.01)

(58) Field of Classification Search
  CPC . H04L 63/029; H04L 51/216; H04L 63/0272; H04L 63/0428; H04L 63/10; H04L 63/102; H04L 63/105; H04L 67/141; H04L 63/166
  See application file for complete search history.

(56) References Cited

U.S. PATENT DOCUMENTS

| | | | | |
|---|---|---|---|---|
| 6,401,128 B1 * | 6/2002 | Stai | .................. | H04L 61/00 709/236 |
| 6,915,345 B1 * | 7/2005 | Tummala | ............ | H04W 12/033 709/225 |
| 7,124,123 B1 * | 10/2006 | Roskind | .................. | H04L 51/04 709/205 |
| 7,139,828 B2 * | 11/2006 | Alkhatib | .................. | H04L 67/63 709/245 |
| 7,706,371 B1 * | 4/2010 | Wing | .................... | H04L 61/103 709/245 |

(Continued)

*Primary Examiner* — Aravind K Moorthy
(74) *Attorney, Agent, or Firm* — PatentPC; Bao Tran

(57) ABSTRACT

Methods and systems disclosed provide for creating private networks for secured communication between devices. The devices can communicate with each other over a secure tunnel created for a closed circle of devices. Furthermore, the methods and systems can enable offline communication between devices on a private network.

20 Claims, 9 Drawing Sheets

(56) References Cited

U.S. PATENT DOCUMENTS

| | | | | |
|---|---|---|---|---|
| 7,899,931 | B2* | 3/2011 | Reed | G06F 9/542 709/206 |
| 7,904,586 | B1* | 3/2011 | Griffin | H04L 45/00 709/240 |
| 8,458,341 | B2* | 6/2013 | Larson | G06F 21/606 709/227 |
| 8,516,117 | B2* | 8/2013 | Munger | H04L 63/1458 709/225 |
| 8,613,045 | B1* | 12/2013 | Shigapov | H04L 63/10 726/28 |
| 8,958,306 | B2* | 2/2015 | McCann | H04W 4/24 455/406 |
| 9,219,761 | B2* | 12/2015 | Ståhl | H04L 12/1482 |
| 9,544,099 | B2* | 1/2017 | Etemad | H04W 52/0206 |
| 9,608,964 | B2* | 3/2017 | Stutch | H04L 63/10 |
| 9,680,801 | B1* | 6/2017 | Martini | H04L 67/563 |
| 9,942,199 | B2* | 4/2018 | Thomas | H04L 63/0272 |
| 10,057,167 | B2* | 8/2018 | Congdon | H04L 61/2514 |
| 11,362,987 | B2* | 6/2022 | Saidumuhamed | H04L 69/16 |
| 11,924,171 | B2* | 3/2024 | Stutch | H04L 51/216 |
| 2001/0013069 | A1* | 8/2001 | Shah | H04L 51/48 709/238 |
| 2004/0037260 | A1* | 2/2004 | Kakemizu | H04W 8/04 370/400 |
| 2004/0044739 | A1* | 3/2004 | Ziegler | G07F 7/0826 709/213 |
| 2004/0044756 | A1* | 3/2004 | Johnson | H04L 41/046 709/238 |
| 2004/0044777 | A1* | 3/2004 | Alkhatib | H04L 67/63 709/228 |
| 2004/0044891 | A1* | 3/2004 | Hanzlik | H04L 63/065 713/150 |
| 2004/0083363 | A1* | 4/2004 | Hengeveld | H04L 9/0833 713/163 |
| 2005/0015617 | A1* | 1/2005 | Karsten | H04L 63/0209 726/4 |
| 2005/0055577 | A1* | 3/2005 | Wesemann | H04L 63/0272 726/4 |
| 2005/0262343 | A1* | 11/2005 | Jorgensen | H04L 63/08 713/168 |
| 2006/0075348 | A1* | 4/2006 | Xu | G06F 3/04842 715/764 |
| 2006/0182103 | A1* | 8/2006 | Martini | H04L 63/0428 370/389 |
| 2006/0184672 | A1* | 8/2006 | Lauer | H04L 67/1097 709/225 |
| 2006/0206933 | A1* | 9/2006 | Molen | H04L 63/0428 718/1 |
| 2006/0235973 | A1* | 10/2006 | McBride | H04L 67/53 709/226 |
| 2006/0259524 | A1* | 11/2006 | Horton | G06F 16/00 |
| 2007/0067838 | A1* | 3/2007 | Bajko | H04W 12/06 726/11 |
| 2007/0110244 | A1* | 5/2007 | Sood | H04W 12/0471 380/270 |
| 2007/0136413 | A1* | 6/2007 | Ishikawa | H04L 65/1104 709/200 |
| 2007/0150946 | A1* | 6/2007 | Hanberger | H04L 63/0272 726/15 |
| 2007/0282953 | A1* | 12/2007 | Jain | H04L 51/212 709/206 |
| 2008/0133915 | A1* | 6/2008 | Tanaka | H04L 63/029 713/171 |
| 2009/0003368 | A1* | 1/2009 | Brown | H04L 67/75 370/410 |
| 2009/0210328 | A1* | 8/2009 | Fomenko | H04L 63/10 705/30 |
| 2009/0316709 | A1* | 12/2009 | Polcha | H04L 65/103 370/401 |
| 2010/0011085 | A1* | 1/2010 | Taguchi | G06F 11/3433 709/214 |
| 2010/0167763 | A1* | 7/2010 | Bouthemy | H04L 45/16 455/466 |
| 2010/0228593 | A1* | 9/2010 | Belwadi | G06Q 30/0207 705/14.1 |
| 2010/0250497 | A1* | 9/2010 | Redlich | G06Q 10/06 707/661 |
| 2010/0281251 | A1* | 11/2010 | Arauz Rosado | H04L 63/20 713/161 |
| 2011/0145426 | A1* | 6/2011 | Miyajima | H04L 63/0272 709/230 |
| 2011/0153719 | A1* | 6/2011 | Santoro | H04L 67/1008 709/203 |
| 2011/0258275 | A1* | 10/2011 | Rao | G06F 16/9535 709/206 |
| 2011/0277001 | A1* | 11/2011 | Kaluskar | H04N 21/4131 370/401 |
| 2012/0090035 | A1* | 4/2012 | Mehta | G06Q 10/08 726/26 |
| 2012/0124660 | A1* | 5/2012 | Wang | H04L 63/083 726/3 |
| 2012/0155459 | A1* | 6/2012 | Bouthemy | H04W 4/12 370/389 |
| 2012/0278398 | A1* | 11/2012 | Lowekamp | H04L 41/5009 709/206 |
| 2012/0290686 | A1* | 11/2012 | Anchan | H04L 63/029 709/218 |
| 2012/0317191 | A1* | 12/2012 | Biswas | H04L 41/34 709/223 |
| 2013/0283341 | A1* | 10/2013 | Park | H04W 12/088 726/1 |
| 2013/0346623 | A1* | 12/2013 | Ren | H04L 67/14 709/227 |
| 2014/0082353 | A1* | 3/2014 | Everhart | H04L 9/3247 713/158 |
| 2014/0304505 | A1* | 10/2014 | Dawson | G06F 21/6227 713/165 |
| 2014/0359789 | A1* | 12/2014 | Pitt | G06F 3/0485 726/28 |
| 2014/0366120 | A1* | 12/2014 | Wood | H04L 63/10 726/15 |
| 2015/0007272 | A1* | 1/2015 | Zou | H04L 63/08 726/4 |
| 2015/0052525 | A1* | 2/2015 | Raghu | H04L 67/10 718/1 |
| 2015/0082460 | A1* | 3/2015 | Amiga | H04L 63/145 726/28 |
| 2015/0110090 | A1* | 4/2015 | Ding | H04W 4/08 370/338 |
| 2015/0188949 | A1* | 7/2015 | Mahaffey | H04W 12/37 726/1 |
| 2016/0013966 | A1* | 1/2016 | Vaidyanathan | H04L 67/52 709/223 |
| 2016/0127474 | A1* | 5/2016 | Sharma | H04L 12/1831 709/228 |
| 2017/0302622 | A1* | 10/2017 | Lyon | H04L 67/10 |
| 2023/0421509 | A1* | 12/2023 | Chandrashekhar | G06F 11/2035 |
| 2023/0421527 | A1* | 12/2023 | Kang | H04L 61/5076 |

* cited by examiner

PRIVATE APPLICATION PLATFORM

PRIORITY

This application claims priority to U.S. Application No. 62/119,792, filed Feb. 23, 2015, and U.S. Application No. 62/133,972, filed Mar. 16, 2015, which are incorporated by reference in their entirety into this application.

BACKGROUND

Businesses and individuals constantly seek a more secured means for communicating over the internet. Lack of privacy, data tracking and the relative ease of hacking are one of many drawbacks for large networks with central servers. Additionally, current systems are not particularly suited to manage offline communication between mobile devices. As such, systems and methods for creating dynamic, discrete and secure networks for targeted users on the fly are desirable. Moreover, private networks that are compatible with contemporary platforms, relatively inexpensive and agile, while allowing for offline communication, can be very beneficial.

SUMMARY

In an exemplary embodiment, a system for secured communication over a private network of devices includes a publisher device, a first member device, a second member device and a server. The publisher device can be configured to communicate with a member device over a secure tunnel. Additionally, the first member device can be configured to communicate with the second member device and the publisher device over a secure tunnel. Further, the second member device is configured to communicate with a first member device and a publisher device over a secure tunnel. Finally, the server can be configured to route offline messages between member devices and between a member device and a publisher device.

In an exemplary embodiment, a system for secured communication over a private network of devices includes a publisher device, a first member device, and a second member device. The publisher device can be configured to directly communicate with a member device over a secure tunnel with or without an outside device of the circle members, such as a relay or an external server. Also, the first and second member devices can be configured to directly communicate with each other over a secure tunnel with or without an outside device not associated with the circle members, such as a relay or an external server. The system can be configured to route offline messages between member devices and between a member device and a publisher device.

In an exemplary embodiment, a method of providing secured communication over a private network of devices may include (a) receiving from a publisher a first private circle data, wherein the private circle data may be a first member data and a second member data (b) providing to a first publisher device a first microserver framework, (c) providing to the publisher device a first private circle application, (d) providing to a first member device, a second microserver framework and a second private circle application, (e) providing to a second member device, a third microserver framework and a third private messaging application, and combinations thereof. The first private circle application may include instructions for communicating private circle information with a member device. The micro-server frameworks can include instructions for establishing a secure tunnel between two members and/or a between a member and the publisher. Further, the private circle applications can include instructions for communicating private circle data between member devices, such as between a member device and the publisher device and/or between two member devices.

In an exemplary embodiment, a method for secured collaboration over a private network of devices may include (a) providing a microserver framework and a private circle application to a publisher device, (b) providing a microserver framework and a private circle application to first and second member devices, (c) establishing a secure tunnel between the first and second member devices and between the publisher device and each member device, (d) distributing the first messaging archive file with the second messaging archive file, and combinations thereof. The first member device may include a storage medium having a first messaging archive file, and the second member device includes a storage medium having a second messaging archive file.

DESCRIPTION

Figure 1:
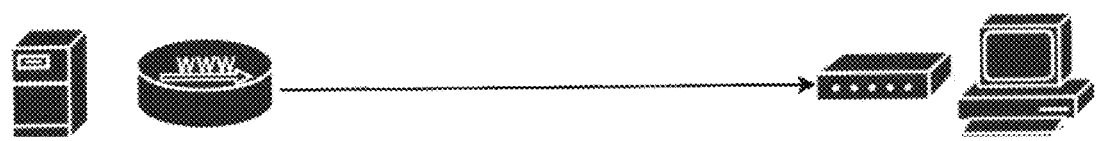
FIG. 1 illustrates n exemplary client-server system.

The present embodiments describe private networks for secured communication between devices. In particular, the devices communicate with each other over a private network created for a closed or semi-closed circle of devices. Furthermore, the offline communications between devices may be handled and properly distributed within the exemplary network.

For various reasons, individuals may wish to organize into specific private circles in order to securely communicate between themselves over a private network. For example, these individuals may wish to communicate on a shared interest such as an event, a sports team, certain promotions or a scholarly topic. In some instances, members of a private circle may wish to collaborate by revising and commenting on one or more documents or other file format, such as a calendar, presentation, workbook, media file, etc. Exemplary embodiments may communication over a private network to provide additional security by avoiding the use of cloud-based resources. In addition, such private networks may be formed quickly and relatively inexpensively.

The system and methods of exemplary embodiments can also provide for managing offline activity of the member devices within a private circle. For instance, messages, comments, revisions, etc. that are made when the sender's device is offline may be distributed to other devices. Therefore, this feature may not restrict private circle member activity to only those that are online.

Exemplary contemplated devices for use in the private circle may include any computing device suitable for communicating with another device over the private networks described herein. For example, the devices may include mobile computing devices such as mobile phones, tablets, laptops, and the like. Moreover, the type of communication may include any type of data transmission between two devices over a secure tunnel connection. As further described below, such data can include SMS messages, MMS messages, document files, media files, text files, presentations, voice, videos, audio recordings, or any other suitable form of data that can be communicated over a secure tunnel. In exemplary embodiments a "secure tunnel" refers to a secure or encrypted communication over or through an unsecured space or across an unsecured boundary. A non-limiting example of such encrypted communication is via Secure Sockets Layer (SSL) protocol.

In an exemplary embodiment, a method of providing secured communication over a private network of devices includes providing a microserver framework and a private circle application to members and a publisher. In one embodiment, a publisher creates a private circle using a microserver framework and a private circle application and invites members to join this circle. Upon joining, the members and the publisher form a private closed circle.

As used here, "publisher" generally denotes an individual device that arranges a specific private circle and invites at least one other person to join that private circle. Thus, the publisher may be regarded as the administrator of the individually formed private circle. The individuals who join the private circle are referred to as "members." Therefore, the publisher who is also part of the private circle can be regarded as a member as well. In some embodiments, the publisher and/or member(s) are an individual representing a business entity.

In an exemplary embodiment, a publisher determines the private circle features. The private circle features may include member data and private circle data. The member data can include name, contact information (address, email, phone number, etc.), position, title, or any other relevant information about a member. The private circle information can include essentially any information of interest to the members. For example, a calendar of events, restaurant menu, list of promotions, professional-client data (e.g. medical, legal or other sensitive data) or emergency/disaster information, all of which may be constantly updated or commented on by the publisher and/or members. The private circle information may include data and/or files containing data; files may include calendar files, document files, media files, etc. The publisher creates and publishes a private circle application (scheduling, storing, exchanging, messaging, etc.) to run on a microserver framework. Once installed on a device, one microserver can serve multiple private circle applications.

In an exemplary embodiment, a private circle application allows members within a particular circle to communicate with each other. To that end, the publisher furnishes the private circle features to a private circle application template. The private circle application, using this template, is then unique with respect to the members and the private circle data.

For example, a publisher can access a website for downloading the private circle application and a template with the desired look and functionality. The template and the private circle application are then provided to the publisher's computing device, such as desktop, laptop, smart phone, tablet, etc. (referred to as the published host device). The publisher may then populate, modify, or make selections for the template with the private circle features of interest to the specific application of the intended private circle. For example, the publisher may add member name and contact information (either as data fields and/or as actual data entries) as well as a calendar with meeting times. The template and private circle application are then downloaded to the publisher device. A secured method of transferring this private information involves a hard wire sync cable between the publisher host device and the publisher device. The populated template and the private circle application may also be provided directly from the website to the publisher's device without the intermediate step of downloading to the publisher's host device, and synching with the publisher device.

For added security, the publisher may delete the private circle application and the template from the PC after it has been transferred to the publisher's device. Therefore, the potentially sensitive private circle data is only accessible on the publisher's device. Moreover, such data is only sharable via the secure tunnel with only the selected members of the private circle. Accordingly, an exemplary embodiment permits the creation of a private circle without providing any personal, sensitive, or specific data to a remote server before or during creation and/or subsequent use of the circle.

In the present embodiments, a microserver framework provides a framework for one or more private circles. The publisher creates and publishes a private circle using a private circle application running on a microserver framework. Only members within a particular circle will have permissions to that private network. The microserver framework can use a Security Manager to handle the private network's secure communication channels (VPN, https, etc.), firewall, authentication, authorization, and crypto (communications and data). Accordingly, a private network is created when each device within a private circle installs a microserver framework which distributes data throughout that network to each authorized device in the individual and separate circle.

In order to connect the members within a private circle, the publisher can send an invitation to each member device. After downloading the microserver framework and the private circle application, the publisher invites other members to join the specific private circle. The invitation may be, for example, a text message with information regarding the private circle. Further, the text message may include links to a location for downloading the microserver framework and private circle application.

A separate invitation may be sent from the publisher device to a first member device and a second member device. An invitation may also first be sent from the publisher device to a first member device, and the first member may then re-send the same invitation to a second member. As such, members may be able to invite other members within the private circle.

The system may be used with any number of members devices as supported by the network(s) of the devices. Therefore, the number of members in any given circle is limited only by the ability of the network(s) to sustain them. If the network, device storage, and processing power is robust, there is the ability to support millions of circle members.

The invitation also includes information for installing a microserver framework. The members and the publisher may install the microserver framework on their separate devices to establish a private network connection, such as a secure tunnel, between their respective devices. The private circle application may then allow the private circle data to be communicated between the members securely over this secured network.

Upon confirming the invitation receipt, and downloading the applications, the confirmed member's device receives from the publisher device, the security information for establishing a secure tunnel with others in the private circle. The security information provided can comprise keys, handshake, authentication and any other security files required to establish a secure tunnel with the other devices.

In the present embodiments, the private circle application supports specific private circles that can be publisher-built or pre-built configuration files. User functionality (scheduling, storing, exchanging, messaging, etc.) is provided within the private circle framework. This framework may allow access to local device resources including import capability to integrate data into the private circles. Additionally, a public API can support third party applications allowing access to the microserver framework. The microserver's install manager can handle device bootstrapping, user enrollment/reenrollment, etc. while the instance manager tracks all private circles and any authorized third party applications. It can manage the entire instance life-cycle and current Private circle status. Additionally, the microserver's Data Store function can manage data for each instance, can handle replication and conflict resolution, as well as clean-up after de-provisioning. Configuration of functionality occurs through a permissions-based Administrator (publisher) user interface (UI). The microserver and private circle application functionality may depend on and utilize resources of the device operating system. As such, the number of private circles, (or private networks) available on any device is limited only by the capacity of the device.

In an exemplary embodiment, the Publisher (system administrator) can therefore create and publish one or more private circle applications (scheduling, storing, exchanging, messaging, etc.) to run on the microserver framework. The publisher initially sets a list of members to be notified and invited into the private network. Once the network is established members may be allowed to invite new members to join and change access privileges. Once installed on a device one microserver framework can serve multiple private circles simultaneously. The microserver instance manager can track all private circles and any authorized third party applications, including software, hardware, input/output, user interfaces, etc. It can also manage the entire instance life-cycle and current private circle status. The microserver's data store function can manage data for each instance, handle replication and conflict resolution, as well as cleanup after de-provisioning. Configuration of functionality can occur through a permissions-based Administrator user interface. The microserver and the private circle application functionality can depend on and utilize resources of the device operating systems. Thus, the number of private circles, thus private networks, available on any device is limited only by the capacity of the device.

Data flow may be managed differently based on the system design. For example, a secure tunnel between the members and the publisher may or may not include an intermediary device for relaying the messages between the devices. Therefore, the secure tunnel connects the members, the publisher and an intermediary relay device. The devices may also be directly connected or directly communicate without a relay.

In one embodiment, the member devices communicate via a client-server model. As such, the request from a device may be satisfied by an intermediary device within the private network. An example of an intermediary device is a central server for relaying data between member and publisher devices. In an embodiment, the member and publisher devices communicate as a peer-to-peer network. Thus, a request from one device is directly satisfied by another device. In yet another model, the devices communicate on a hybrid model, using both client-server protocol as well as peer-to-peer networking.

In a peer-to-peer scheme, the device communication can be distributed over one or more devices. For example, the publisher device may be the source for communication across the private circle. When data speeds or loads to the publisher device exceed a threshold amount, or when the publisher device is unavailable, one or more other member devices may be used to support the communication or data transfer across the private circle. Downloading data or transferring data onto one device can become easier as more members join the circle. That is, when the load is distributed over many devices, downloading speed for private circle data can improve. Accordingly, in one embodiment, the member and publisher devices further comprise a peer-to-peer file sharing application. Thus, devices may also include an application enabling a peer-to-peer file sharing protocol (e.g. BitTorrent) for file sharing between devices.

The private circle application provided to a member device can include instructions for communicating private circle information with another member device with the same application. The members and publisher may send direct or offline messages between their devices. As such, in one embodiment, the member and publisher devices include a messaging archive file for managing messages. This messaging archive file may be stored locally on the device and may be created by or downloaded with the private circle application.

In an exemplary embodiment, when a message is "sent" from a member or publisher device that is offline (not connected to the private network of devices), the message is written to the messaging archive file for later communication. When the device goes online (connects to the private network of devices), the message(s) written to the archive file are distributed with message archives of other members. If the sending and receiving devices are online, the message may be both written to the messaging archive file and also sent directly to the other devices. The archive file may therefore be distributed continuously or periodically between devices.

The type of messages contemplated includes essentially any type of data that can be transmitted between two devices over the secure tunnel. In one embodiment, the message is a direct message between members or between a member and the publisher. Specifically, the message can include private circle data, where, for example, a publisher or a member is adding an entry within the template for a specific private circle. The private circle application interface need not be browser-based. Thus, it can be customized to accommodate many different types of interfaces.

In one embodiment, a private circle includes members collaborating on at least one document or other file type.

Here, the private circle application permits access to a document file over the secure tunnel. The document file may be any type of document such as, a Word, a PowerPoint, a PDF or any other document format of interest. The file types are also contemplated, such as, for example, calendars. Thus, the members or publisher may provide messages, comments or edits to a document or other file type. In some cases, members may have different levels of access, such as read-only, comment-only, or full edit control privileges. Member access level may be set by the publisher or determined by the members. This status may be assigned when the private circle application template is first distributed, or assigned after the member has joined the private circle. Moreover, the access level may be fixed or variable for the duration of the private circle collaboration.

In an exemplary embodiment, the document is on a server within the secure network, and the members and publisher connect to this server to access the document. Here, the server manages the comments and new versions of the document created by each member or publisher. In one instance, the server may be the publisher device or a member device.

In an exemplary embodiment, each member and publisher device has a duplicate copy of the document (or other file type) locally on the individual device. In this case, the comments and revisions seen on each device can be distributed to other members periodically or continuously to permit efficient collaboration.

In one example, a first member with appropriate level of access may provide a comment on the document version on the first member's device. This initial comment may then create a link on the document to which a messaging archive file may reference or which references a messaging archive file. Accordingly, a second member is able to view the comment(s) via a link on the document to a consolidated list of comments across members. Each member may contribute to a comment to create a message stream for that comment. Each subsequent message on the message stream may create a running message thread that is saved in one or more message archive files. As such each new comment (e.g. on a different section of the document) may result in a new comment stream and a new version of the document. The comment streams may be stored on different messaging archive files or within the same messaging archive file. Additionally, each device may comprise a new archive file for each new comment stream where these files are distributed to reflect the latest messages from each member or may comprise a single archive file for each document across all users or may comprise a single archive file per document per user so that a new archive file is generated for each member for each document.

The messaging archive file for comments on a document can be distributed across devices to ensure efficient collaboration. If a first member creates an initial comment or adds a message to an existing comment stream while the first member device is offline, a messaging archive file may be created (if first comment) or updated on this device to reflect the new entry. At this time, a second member, who is online, will not see the new entry from the first member. The second member can create a comment or add to a comment stream that may also create or update a messaging archive file. The second member's messaging archive file may then be distributed with the messaging archive file on other devices that are also online. When the first member device connects to the network, his messaging archive file may then be distributed with other devices online, and other members can see the comment. When a member then views a comment within a document, the distributed archive files are compiled into a single arranged and integrated list.

In one embodiment, each entry (comment or message) receives a timestamp such that members of a private circle are able to see when a comment or message was made, and/or the comment may be inserted into the appropriate chronological location of a comment stream when comments are distributed across on-line and off-line devices coming back on-line. Specifically, the messaging stream may be viewable in real time, similar to a chat window, for the devices that are online. Members may also be able to directly message each other and are not limited to only messaging on the document.

In an exemplary embodiment, a comment string may be created and anchored within a document or other file type. For example, a comment location may be identified either by a specific location in the document (page, line, pixel, coordinate location, etc.) or by a tag or other identifier to specific text, image, etc. The anchor may be saved directly in the document or in a user's revision file. If the anchor is part of the document, then the document may be saved as a new version and the version control for editing a document may be employed. The original comment may also not be saved within the document, but also be included within an individual member's archive file. Members may thereafter comment or continue the comment string. The original or additional comments may or may not alter the document itself. If the comments do not alter the document itself (e.g. when an anchor does not alter the document or when comments are continuing an already anchored comment string), they may not require implementation of the document revision control, such as checking out the document. For example, a member may make a comment in a comment string. The comment may include comment data such as a time, the document, and an anchor (either within the document or separate from the document) to indicate where a comment belongs, in which document, and the time it was made. The comment data may be written to the individual member's archive file. When a comment is viewed by any member, the private circle application may retrieve the individual member's archive files and integrate the various files for display to the viewing member. For example, the comment data may be retrieved from various member archive files, and the comments arranged and displayed in a desired order (such as chronologically or by member) and overlaid on the document, such as through an over-laid viewer, window, or other application outside of the document or working in conjunction with the document (such as using the comment feature already employed within a document software). In this way, multiple comments may be made simultaneously or sequentially without having to lock a document or handle revision controls on the underlying document or file type.

Similarly, when a user is off-line, they may also continue to comment in a similar fashion. Their comments may be saved in the individual member's archive file. Once on-line, the previously off-line member's archive folder may be read by the private circle application across other on-line member devices, and the previously off-line member's comments incorporated into the comment string(s) in their appropriate place (such as chronologically or by member or appended at the end as new to the circle comments).

As just described, each member may have their own archive file to which they have read/write access and can write or log their respective edits. The individual member files may be shared across devices periodically or in real time such that an individual member may have a separate archive file for each member of the private circle or for each member that has made a comment or modification to a base file. Each member may also have an archive file for their own comments and modifications and another combined archive file that includes the edits and comments of all of the other members integrated into a single "other" archive file. The individual member device may also only retain the member's archive file for the given device, and the private circle application retrieves and displays the data across the devices to integrate comments into a complete string without locally saving an archive file for the entire string or for other member contributions to the string. The individual member may select to back up the comments string, such as for review when going off-line, and retrieve the comment string of other members. The shared member files may be stored on each member device and/or a host device, such as the publisher's device. Other member's files may or may not be editable by the storing device, if the storing device is not the member device to which the member archive file corresponds.

The comment display may be set at the private circle application level, such that all members have the same user interface experience, or may be set at the individual member level. For example, each member may decide to view the comment strings in their own way. One member may choose to view comments chronologically, either based on the comment creation time or comment shared/distributed time (for those that share comments after being offline); while another member may select to view comment segregated by member. The entire user interface of the application, and not simply the comments may be set at the individual member level or across the entire application.

Document editing and revision control may be handled in different ways.

In an exemplary embodiment, each member and publisher device includes a storage medium comprising a document revisions folder. Each time a document is edited (add/remove text, change formatting, etc.) on a first member's device, a new version of this document is created in the revisions folder of this device. When the first member device is online, the second member device will then update its revisions folder to obtain the latest version of the document. As such, the document revisions folder for each device can contain multiple versions of a document edited by different members. This can be advantageous for a private circle having relatively few members or a private circle where only a few members have editing privileges.

In an exemplary embodiment, revision control is handled using a check-in and check-out system. Accordingly, when a first member checks-out the document, the document is then locked on a second member device (and other devices) for editing until the first member checks the document back in. The check out may occur as soon as the document is opened with the identified intent to edit the document. The member may therefore open a document as read only or as read/write. The check out may also occur as soon as the document is edited by the first member viewing the document, thereby locking the document from being opened with write privileges or permitting edits on an already opened document on another device. The other members may have permission to provide comments or contribute to a comment stream while a document is checked out. This system of access can be accomplished in various ways. For example, members may need to go through the private circle application in order to obtain permission to edit their document. Therefore, the private circle application may permit only one instance for editing. Accordingly, after the first member selects editing permission on the private circle application interface, the second or any subsequent member will not have the option to obtain the same privilege until the first member cancels his permission. Members may also message each other to coordinate turns for editing the document. Documents may also include an editable flag or other indicator that identifies whether a document may be edited. Once an edit is made to the document, a notice may be sent across the circle to limit edit privileges on other devices by changing the flag associated with the document.

Distributing data across devices may be based on different factors. For instance, constantly distributing a new revision of a large document file across devices may require significant resources. On the other hand, infrequent messages may not require as much resource. In an exemplary embodiment, data is distributed to all the online devices on a predetermined schedule. For instance, on-line devices may receive data every few hours, minutes or seconds. In another embodiment, all devices may receive data at a predetermined time (or times of the day).

If a document is edited, either off line, or after a document is checked out, the document versions may branch such that a document revision tree is made. For example, if a member is offline or must edit a document after the document is indicated as checked out (or if the check out feature is not used to restrict edit capabilities), then the first "checked-out" or document with the first revision may be designated as the primary document, and a back-up or separate branch is made of a document originating from a version before edits of the first revision are made, thereby having different revisions from the original. Separate versions of the document may therefore exist thereafter. Alternatively or in addition thereto, once the different document revisions are checked in, the revisions may be integrated back into a single version. For example, the documents may be incorporated sequentially with edit identifiers (text removed or added) sequentially from the original document, to the first revision, to the second revision. The edits may also be recognized as originating to the same or different portions of the original document text. If the changes are to different portions of the text, then the modifications may be incorporated to the respective portions without conflict. When edits are made to the same portion, then the alternate portions may be indicated sequentially or in the alternatives such as by changing the actual text edits to comments where the comment is the proposed or modified text, and each alternative is its own comment. Both options for the language may be inserted into the body of the document. The modifications may be identified, such as by strike through, underlining, bolding, highlighting, color coding the text, or otherwise to indicate and addition, deletion, or source (member) of the edit. One or more edits may also be simply made as comments appended or tagged to a line, letter, or word of text. In this case, the modifications may simply be proposals. The text may be incorporated into the document (i.e. the modification identifiers and/or comment text) once one or more members have approved the modification. For example, the publisher may have modification approval rights, or a modification may be approved with a majority, or identified set or sub-set of members. Once approved, then the proposed text or otherwise identified text becomes the new text or section of the document and the identifiers may be removed.

A publisher may create multiple private circles. Thus a publisher may be a member of different private circles which would communicate over different secure tunnels. Similarly, a member may join many different private circles. Thus, each private circle would have its own template and secure tunnel path.

After use, a private circle may be decommissioned. In other words, the private circle is dissolved and the members will no longer be able to communicate over that private network. In some instances, the private circle data may be retained for setting up a similar private circle in the future.

In one embodiment, the use of the private circle application and related services may be subscription-based. For instance, a recurring monthly fee may be applied to the publisher account while the private circle application is in use. This subscription fee model may vary based on the features used, number of members, level of support required, and type of template needed, among other things.

DETAILED DESCRIPTION OF THE FIGURES

Figure 2:
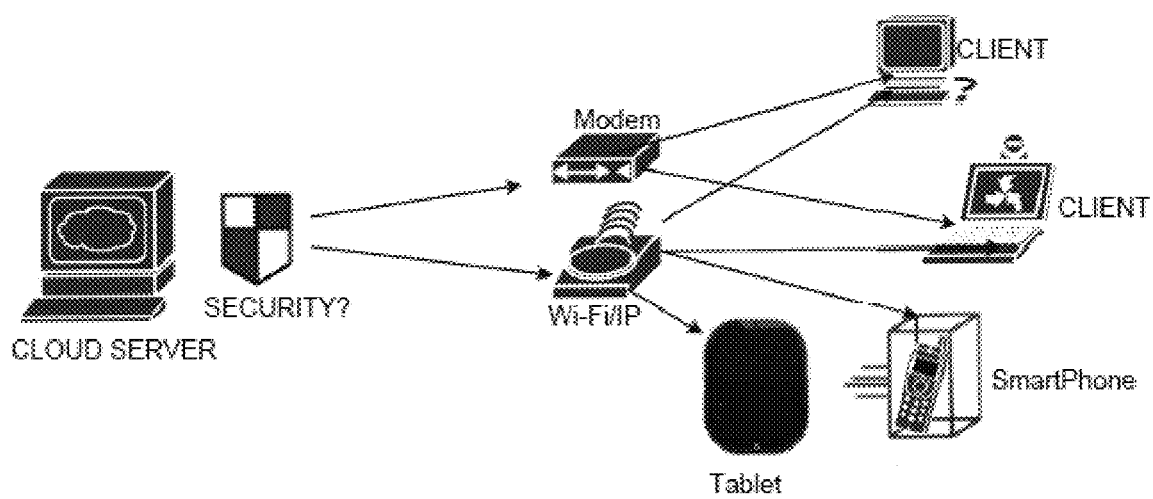
FIG. 2 illustrates networks with multiple devices connecting to a cloud server.
Figure 3:
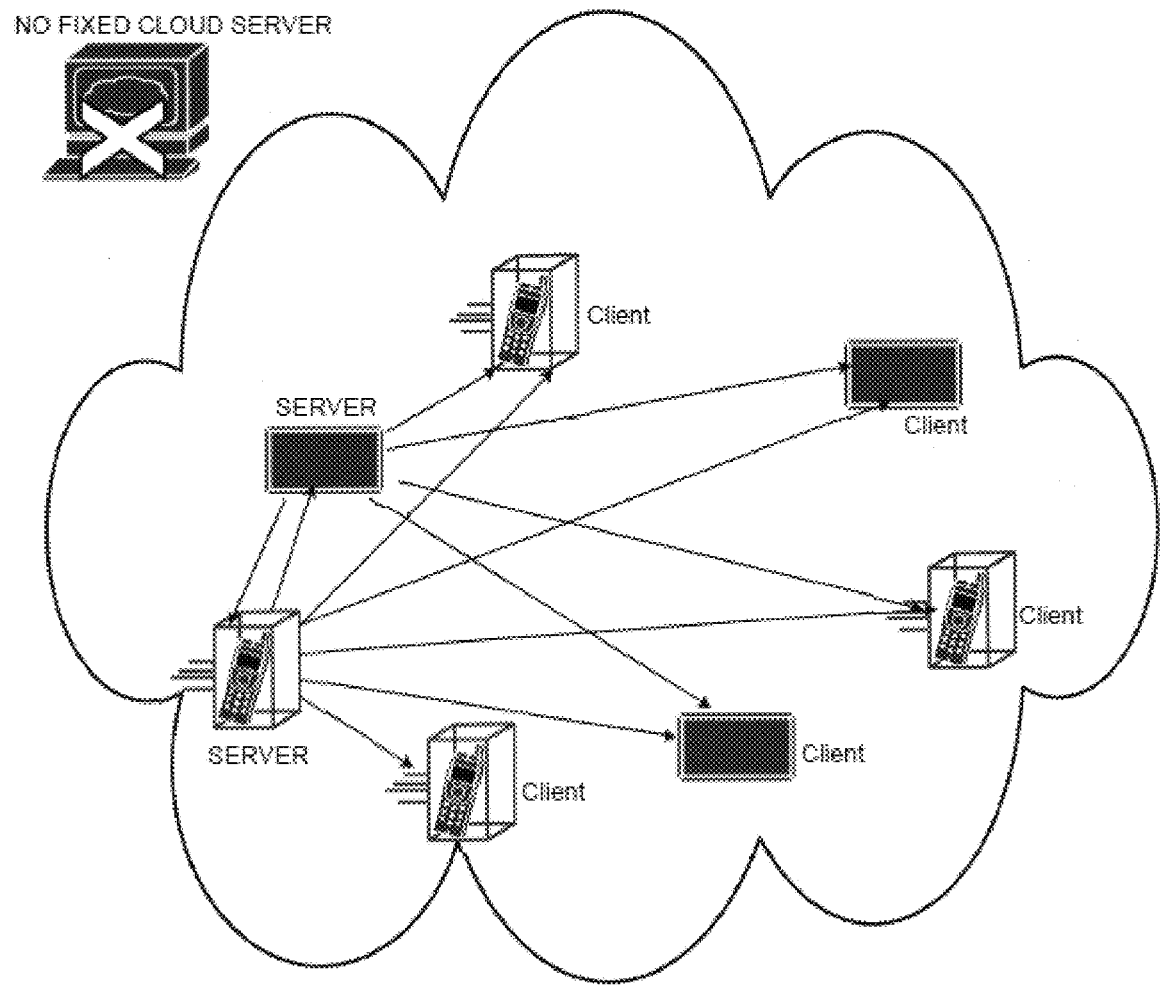
FIG. 3 illustrates the concept of a group of devices operating as a cloud according to an exemplary embodiment.

Networks have evolved from a simple client and server arrangement shown in FIG. 1 to multiple devices connected to a cloud server as shown in FIG. 2. With this increased complexity, additional security concerns arise. Exemplary embodiments described herein include a private cloud of devices as illustrated in FIG. 3. Exemplary embodiments may improve security in networked communications by avoiding a fixed cloud server location that may be monitored or hacked by an outside observer or perpetrator. As shown, the tablet and mobile phone devices form a cloud where the devices operate as clients and servers.

Figure 4:
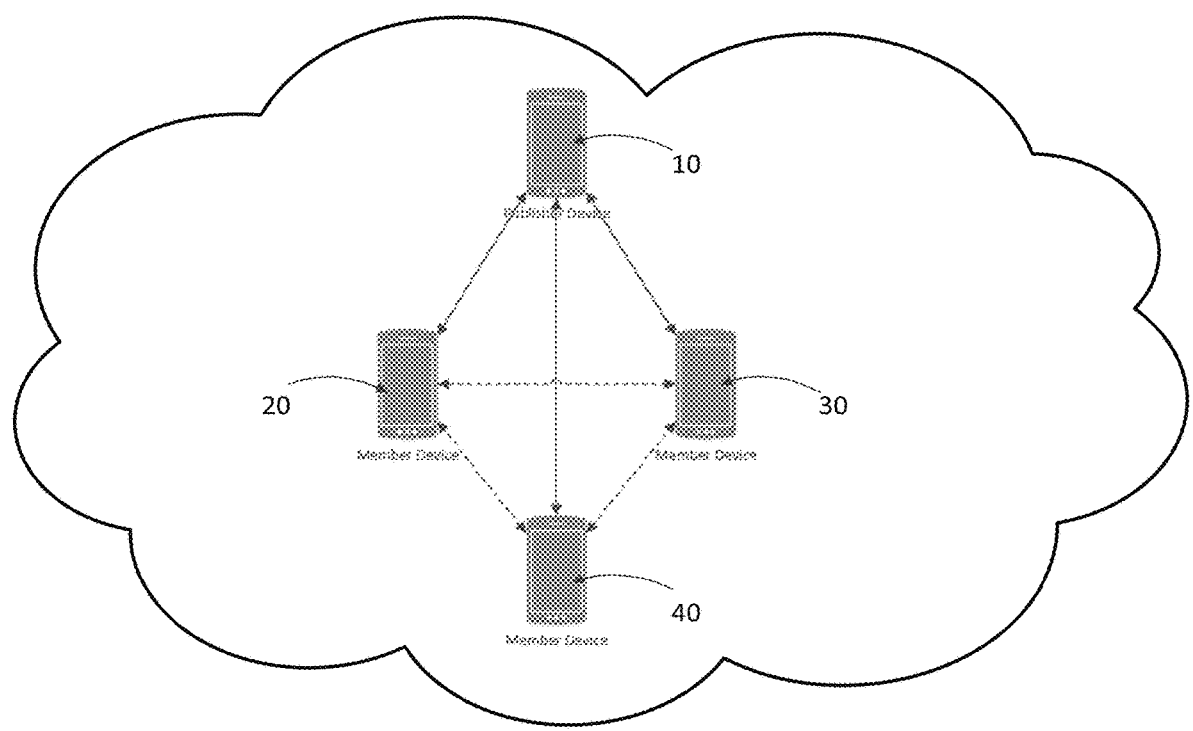
FIG. 4 illustrates a simplified network formed between a publisher device and member devices according to an exemplary embodiment.

In the embodiment shown in FIG. 4, the member devices 20, 30 and 40 along with the publisher device 10 form a private cloud. This arrangement may further include an accelerator server (not shown) to facilitate communication, particularly if the number of members increases.

Figure 5:
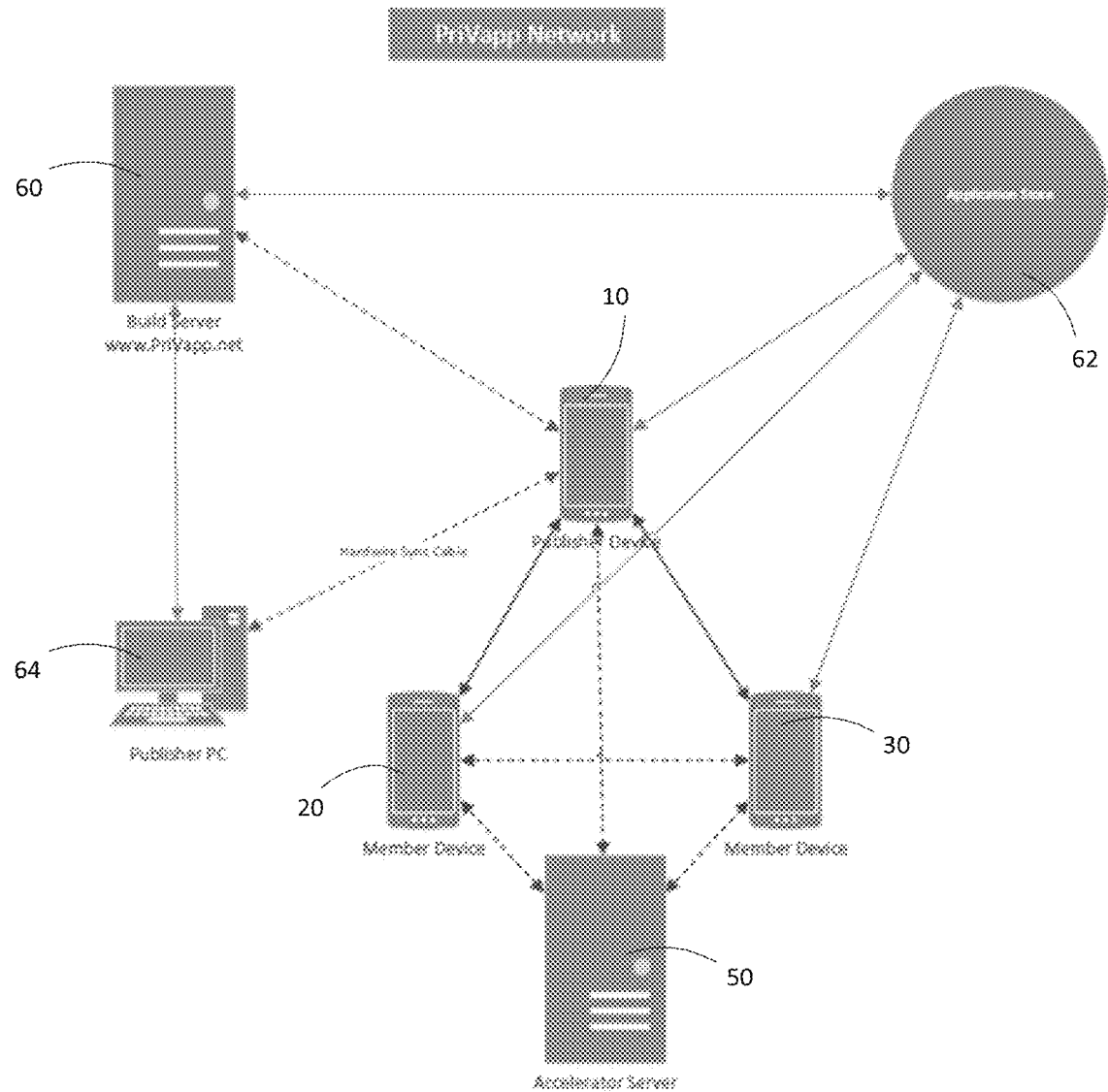
FIG. 5 illustrates and exemplary communication paths between member devices, a publisher device, and a sever.

In one embodiment, building a private network involves providing microserver (e.g. SoftServ) framework and private circle (e.g. Privapp) application to members and publisher. As shown in FIG. 5, the framework and application from the build server 60 can be provided to the publisher 10 and members 20 and 30, via the application store 62. The publisher 10 can customize the private circle application and download to the publisher's PC 64, before synching with the publisher device 10. Here, the network to be formed between the devices further comprises an accelerator sever 50.

Figure 6:
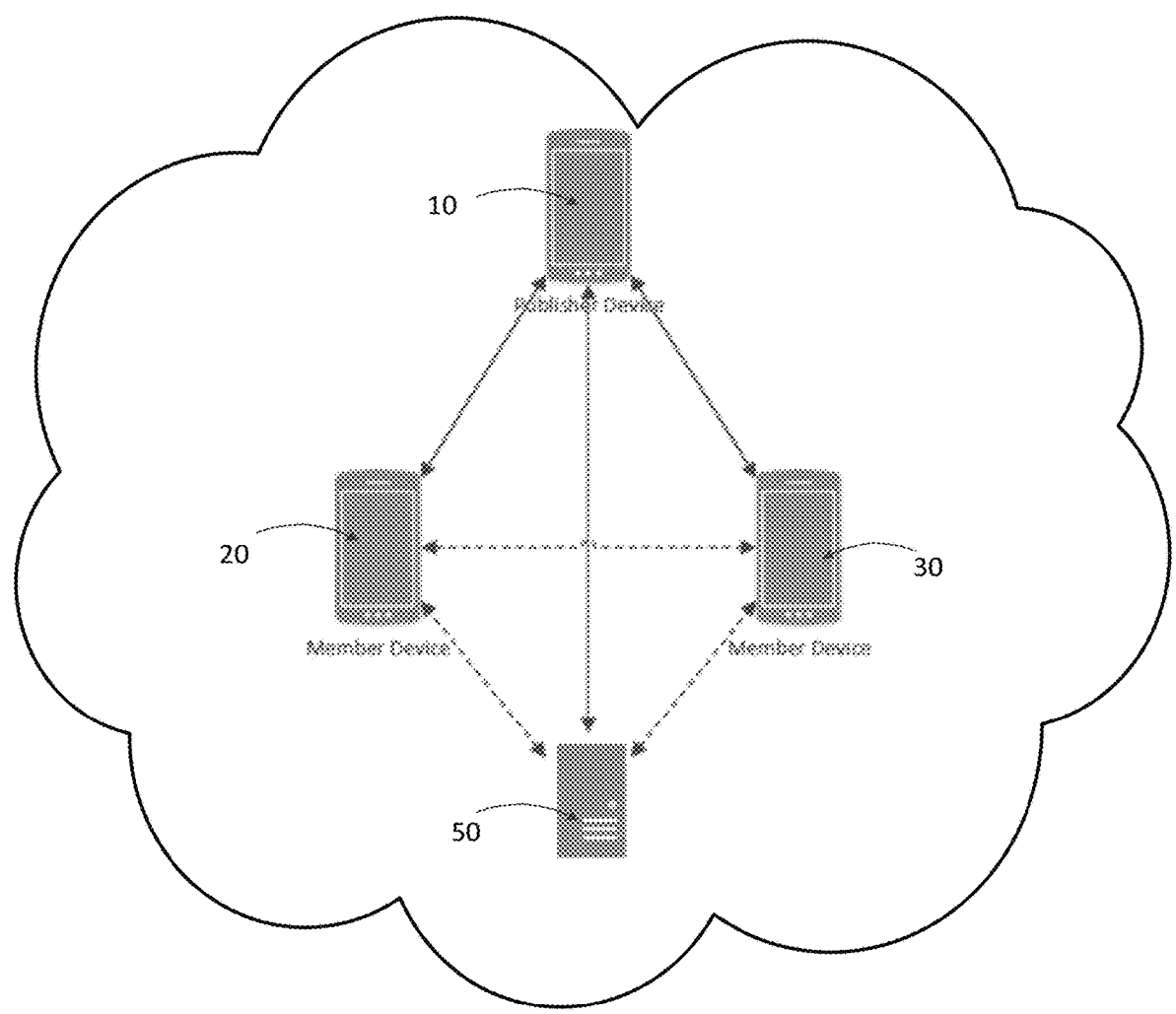
FIG. 6 illustrates a network where the publisher device, member devise and a sever form a closed cloud.

An example of such network formed after the members 20 and 30 install the applications and connect with the publisher 10, is shown in FIG. 6. This simplified illustration shows the member devices 20 and 30 along with the publisher device 10 and the accelerator server 50 forming a private cloud.

Figure 7:
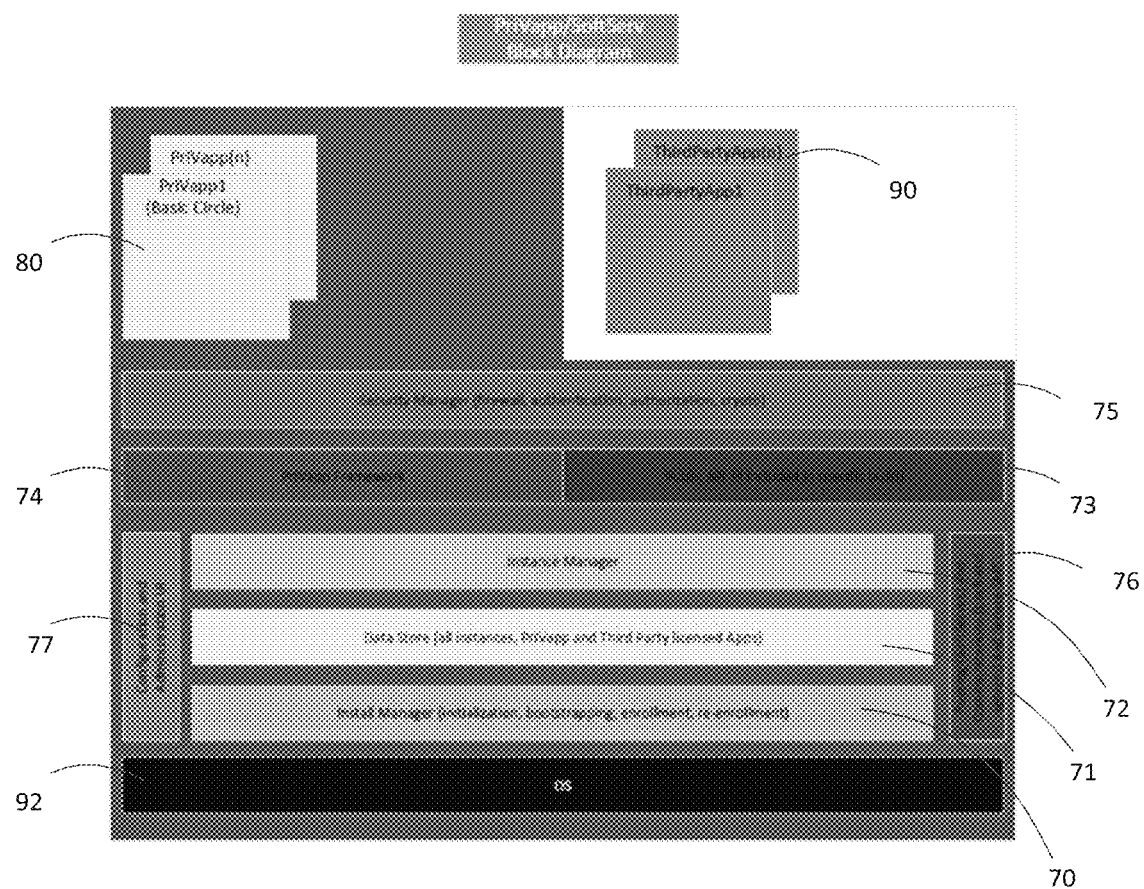
FIG. 7 illustrates a block diagram of the applications that may be involved in a private network formed between devices.

The microserver framework can be installed on a mobile device's operating system 92 and may have many components as shown in the block diagram of FIG. 7. Here, the install manager 70 of the microserver framework handles initialization, boot strapping, enrollment/reenrollment of devices among other things. The microserver data store function 71 manages data for each instance of the private circle. Further, it can handle replication and conflict resolution, as well as clean-up after a private circle has been de-provisioned. The microserver instance manager 72, manager can track all private circles and any authorized 3rd party applications 90. For instance a device may be connected to multiple private circles at a given time.

A public application programming interface (API) 73 may be included in some cases. When included, this API 73 supports the third party applications to permit access to the microserver framework. The private circle application (e.g. PriVapp) 74 utilizes the microserver framework for various functions for a private circle 80.

The microserver framework also provides a security manager 75 for establishing firewall, authentication, authorization, and encryption. Additionally, the microserver privilege function 72 can handle peering, back end server communication and secure SMS communication. Finally, the Configuration and administration user interface 77 can be used to manage the microserver features.

Figure 8:
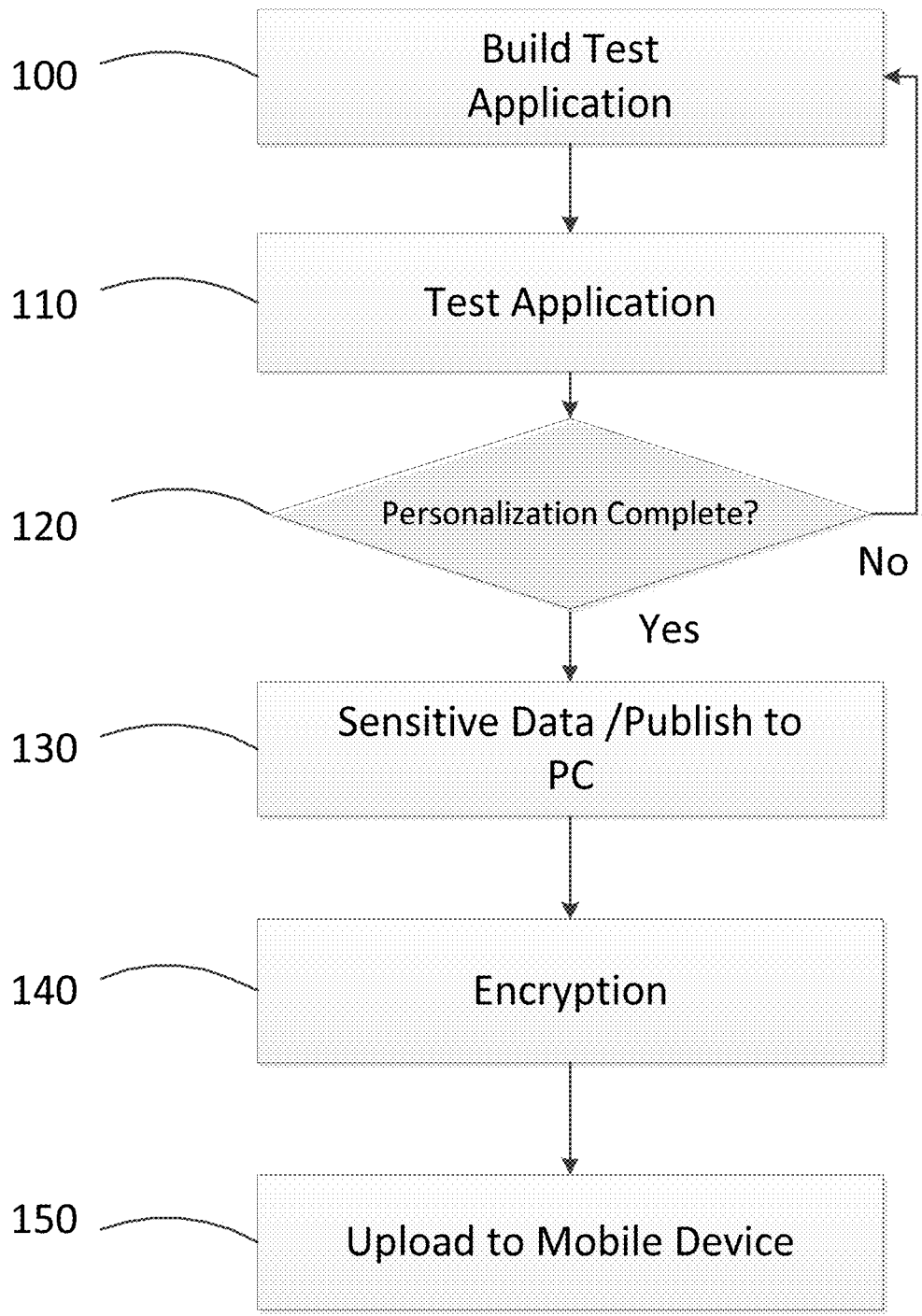
FIG. 8 illustrates a flow chart illustrating some steps in creating a private network of devices according to an exemplary embodiment.

FIG. 8 provides a simplified flow chart showing the steps in using a private circle application to build a private circle. In step 100, a publisher selects from a list a suitable template and builds a test application. Upon further tweaking and testing the application in step 110, the publisher determines if the application requires additional personalization, per step 120. If further modification is needed, the publisher may further modify the application and upload additional branding and personalization. Once the personalization is complete, in step 130, the publisher downloads the application to his personal computer and includes sensitive information (member identification, address, etc.) for this private circle. Having already downloaded the microserver framework, the publisher encrypts the private circle data in step 140 and uploads the private circle application 150 to his mobile device.

Figure 9:
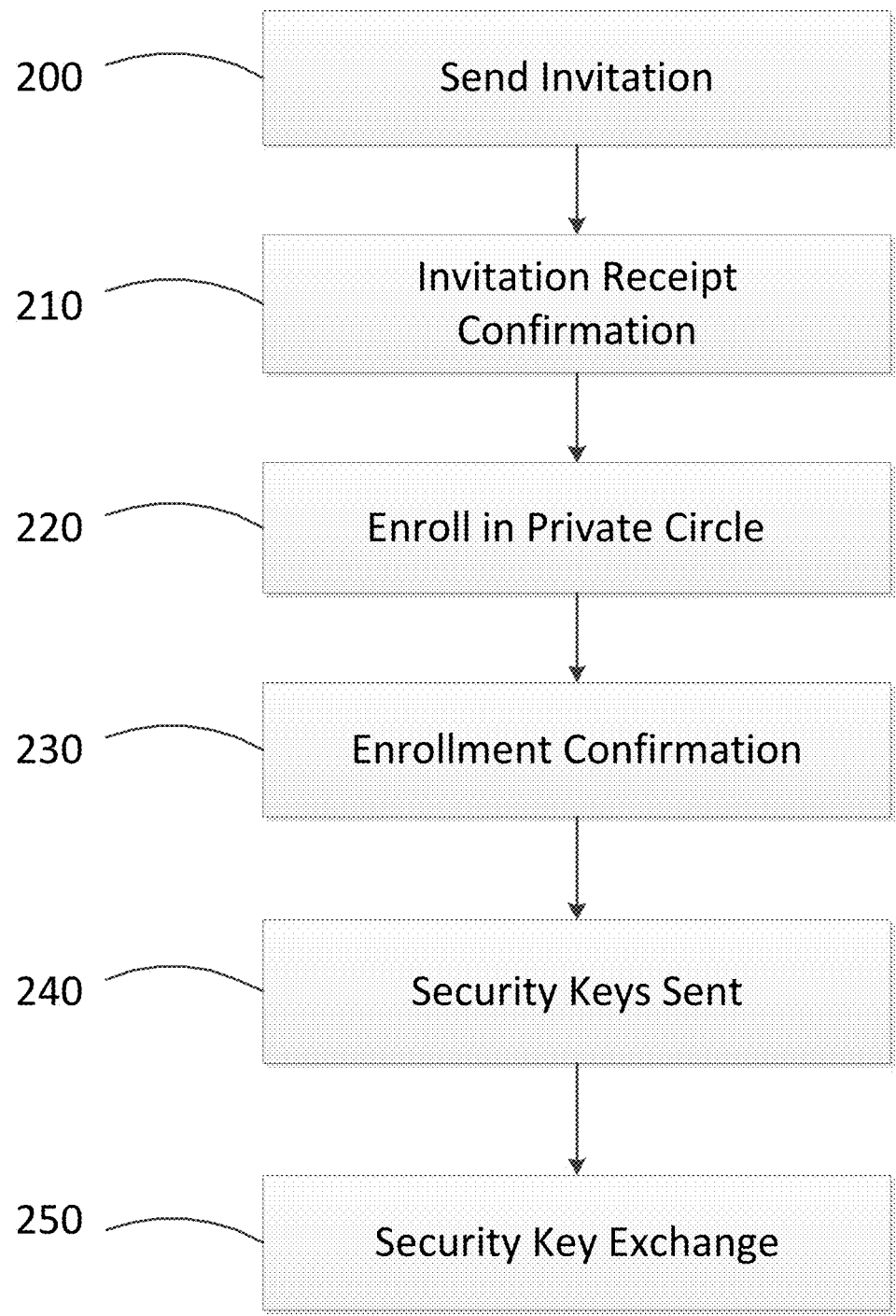
FIG. 9 illustrates a flow chart including some steps in creating a private network of devices according to an exemplary embodiment.

The downloaded private circle application along with the data is shared with members in order build a private network as shown in the simplified flowchart of FIG. 9. Here, having downloaded the private circle application on a mobile device, the publisher sends an invitation 200 to members within this private circle. A member may then reply by confirming receipt 210 of the invitation. At this point, the member enrolls in the private circle by installing the microserver and private circle application per septs 220 and 230. The publisher then sends security keys 240 to the member device and after the keys are exchanged 240 the private connection is established between the devices.

WORKING EXAMPLES

Working examples of some embodiments are provided in following section, without any intent to limit any particular embodiment. In these examples, the devices utilize a microserver framework called SoftServ™ and a private circle application called PriVapp™, both available at www.privapp.net. The device platforms in the following examples are iPhone® or iPad® devices, although the present embodiments is not limited so these devices and may utilize other operating systems.

Example 1: Soccer Team Private Family Circle

Soccer Coach wants to run the school soccer season using PriVapp. To protect the private information of the team members, their families, team activities and locations. PriVapp is the one-stop application aggregating team information and communication. Using a laptop/desktop PC Coach goes to www.privapp.net and selects a template. Coach tweaks the, functions, layout and graphics until acceptable; then saves the template locally to PC hard drive. Having created an acceptable shell coach downloads the SoftServ microserver and sets up a preferred payment method. With the PriVapp shell downloaded, the Coach leaves www.PriVapp.net thus the Internet and the PriVapp now lives only on coach's local hard drive.

As a publisher, the Coach working locally, creates the list of the Team's circle of members who will later be invited to get the PriVapp. Using drag and drop of .vcf or other address book types as well as data entry, publisher populates the template with sensitive information: soccer team names, email addresses, phone numbers, caregiver, family and other relevant information. Using a sync cable, publisher connects mobile device, follows prompts and uploads the PriVapp mobile application to the SoftServ microserver previously downloaded from the Application Store.

With the PriVapp and SoftServ loaded on the mobile device, Publisher disconnects the sync cable. The PriVapp now lives exclusively on the Publisher's mobile device. For heightened security Publisher deletes that PriVapp from the desktop PC. The published PriVapp complete with sensitive information is now a freestanding functional application on the Publisher's device. With the team's circle of members already established, using SMS, the publisher now invites circle of members to join The Soccer Team PriVapp. SMS text links to a download SoftServ from the Application Store. Invitees download SoftServ, after which a text message "I got it" is sent back to Publisher. Using secure text embedded in SoftServ, Publisher sends to invited members: keys, handshake, authentication, etc. They are now securely connected. The secure tunnel has been established and the PriVapp can be passed on to members. Downloading may become easier as more Members join as the load is balanced across all qualified devices.

With the PriVapp circle established, publisher and members can now share may types of data including: scheduling, training, messaging, tasking/to do list, shared contacts, newsletters, announcements, exchange data, photos, games, community, player statistics of past games, statistical forecasts of upcoming matches, fantasy leagues and year-to-year metrics. Additionally, they may share alerts for canceled games, schedule and location of games, and parents can organize carpooling/pick-ups, determine MVP and track scores of season. The publisher (coach) is relieved from a great deal of cross-talk and tasks because the PriVapp facilitates those tasks allowing parents and players to handle such matters.

When the season is over, publisher may want to retain the PriVApp data for off-season training or next season. Alternatively the publisher may want to de-provision the Soccer Team PriVapp. Once de-provisioned, the Publisher does not have to pay for that PriVapp. De-provisioning invalidates the keys, and members are sent a secure SMS link informing that Soccer Team PriVapp is no longer in service and to remove the application from their device. SoftServ can remain on all devices to serve other PriVapps people may carry.

Example 2: Pizza Restaurant Priority Customer Circle

Giorgio's Pizza wants to build an inner circle for its most favored core customers using a PriVapp circle called "Giorgio's Pizza Priority Customer PriVapp Circle." It wants to give preferred customers priority access for backdoor ordering during peak times, special offers during slow times, and easy two-step ordering at all times. Order preference, delivery, payment information, names of family and 'others that matter' are all kept securely in Giorgio's Pizza Priority Customer PriVapp Circle. This circle is managed by the Publisher, accessed and used by the customer (member) with editing privileges.

With the Giorgio's PriVapp, core customers feel privileged with the special recognition and exclusive access. These features, may encourage customers to order more frequently to enjoy the shortened delivery times. Loyalty program tracking can offers for non-members the privilege of receiving an invitation to join the Giorgio's PriVapp upon earning a certain amount of loyalty points. Giorgio's staff is relieved from a great deal of noise and tasks because the PriVapp facilitates ordering, shorten phone hold times, and reduce lost business due to hang-ups/turned away phone calls. In particular, PriVapp orders could be routed to the ordering system and credit card information may be retained to facilitate order placement.

Using a laptop/desktop PC, Giorgio's goes to www.privapp.net and selects from the template library a template that has the functional features described above. Giorgio's enters all non-sensitive/public information such as Logo, menu, prices, etc. then tweaks functions, basic layout and graphics until acceptable; and saves the template locally to PC hard drive.

Having created an acceptable shell Giorgio's downloads the SoftServ microserver and sets-up their preferred PriVApp subscription payment method. With the PriVapp shell downloaded locally, Giorgio's leaves www. PriVapp.net and thus the Internet so that Giorgio's PriVapp now lives only on Giorgio's Pizza local hard drive.

Giorgio's Pizza as the publisher now populates the sensitive information fields for customers that will later be invited to the private circle. Giorgio's might use their ordering/accounting software to determine the top 300 families, then name, email, phone number, address(es), their typical order, the name(s) of who orders (Dad, Daughter, Sitter) or any information to that facilitates business between the business (publisher) and the customer (member).

Using a sync cable, Publisher connects mobile device, follows prompts and uploads the PriVapp Mobile Application to the SoftServ microserver previously downloaded from the Application Store. Publisher performs trial runs on connected device and when satisfied with features, updates the PriVapp on the device and unplugs the sync cable. The PriVapp now lives exclusively on the Publisher's device. For heightened security Publisher may then delete the previous copy of the PriVapp from the PC desktop.

The published Giorgio's Pizza Priority Customer PriVapp Circle complete with all information is now a freestanding functional application on the Publisher's device. Member previously identified can now be invited. Using SMS, publisher now "invites" circle of members to join Giorgio's PriVapp. SMS text links to a download SoftServ from the Application Store.

Invitees download SoftServ, after which a text message stating "I got it" is sent back to Publisher. Of course, those invited are not obligated to join. Using secure text embedded in SoftServ, Publisher sends to invited members: keys, handshake, authentication in order to establish a secured connection. The secure tunnel has been established and the PriVapp can be passed on to the invitees.

With the PriVapp circle established, Publisher and Members can now share data such as: ordering, texting, pick-up/delivery, specials, offers (ex. order by 6:00 pm for 20% off), newsletters and announcements. The publisher's ongoing management of the PriVapp data might best be handled on a tablet with a large viewable screen. With this type of PriVapp, the publisher should be careful about resynching with an unsecure local computer because of its vulnerability to hacking. Giorgios' may wish to update the customer list and details for each customer. For example, the publisher may add or drop members as well as update address, authorized household members, payment information, etc. for existing members.

Upon deprovisioning the PriVaipp, the publisher no longer will need to pay the subscription fee. At this point, the keys are invalidated and the members are sent a secure SMS link informing that Giorgio's Pizza PriVapp is no longer in service and to remove from their device. SoftServ can stay on on all devices to serve other PriVapps.

Example 3: Influencer in a Presidential Campaign Political Circle

In this example, the Campaign Influencer/Publisher wants to create an inside track at a national political party Convention using PriVapp. There could be a need to track and inform selected individuals of where to be and the activities of everyone else. Specifically, information may be about the candidates, special interest groups, the journalists as well as how to get in, how much money is being raised and from whom. Furthermore, the best parties, the names of staff, where to be and how to get in. Therefore, this example may be used as a tool to keep in the nexus of the convention and not be left out.

PriVapp can provide a dynamic calendar application, or may simply provide breaking or spontaneous information through a text/comment/chat posting. For this type of activity, PriVapp aggregates and protects campaign information, helping the circle stay organized, focused and able to securely communicate amongst them.

Using a laptop or desktop, a publisher goes to www.privapp.net and selects a template. He then tweaks the functions, layout and graphics then saves the template locally to PC hard drive. Having created an acceptable shell the publisher downloads the SoftServ micro-server and sets-up a preferred payment method. With the PriVapp shell downloaded, the publisher leaves www.PriVapp.net thus the Internet and the PriVapp now lives only on the publisher's local hard drive.

Working locally, Publisher now creates the list of the Circle of members who will later be invited to get the PriVapp. Using drag and drop of .vcf or other address book types as well as data entry, the publisher populates the template with sensitive information regarding the members.

Using a sync cable, Publisher connects mobile device, follows prompts and uploads the PriVapp Mobile Application to the SoftServ microserver previously downloaded from the Application Store. With the PriVapp and SoftServ loaded on the mobile device, Publisher disconnects the sync cable. The PriVapp now lives exclusively on the Publisher's mobile device.

For heightened security Publisher may then delete the previous copy of the PriVapp from the PC desktop. The published PriVapp complete with sensitive information is now a freestanding functional application on the Publisher's device.

Using SMS, Publisher now invites members to join the circle. Using PriVapp, the publisher sends an SMS text that links to 'download SoftServ from the AppStore'. Those invited download SoftServ, and send a text message stating "I got it" back to Publisher's device. Using secure text embedded in SoftServ, Publisher sends to invited members: keys, handshake, authentication, etc. to securely connect. The tunnel has been established and the PriVapp can be passed on to the members.

With the PriVapp circle established, Publisher and Members can now share data: scheduling, events, messaging, tasking/to do list, shared contacts, daily hot list, announcements, updates, exchange data, photos, community data and candidate statistics. The publisher is able to create gravitas because he is more in-the-know and others will want join the Circle in order to benefit from the inside track.

When the Convention is over, Publisher may want to retain the PriVApp data for next time Or de-provision the PriVapp. Once de-provisioned the Publisher does not have to pay the subscription fee as deprovisioning invalidates the keys. The members are also sent sent a secure SMS link informing them that PriVapp is no longer in service and advising that they remove it from their device. SoftServ can stay on all devices to serve other PriVapps people may carry or publish.

Example 4: Medical Circle

A Physician or patient may sets up a PriVapp Medical Circle private network between primary care provider, patient, authorized patient representatives, and referred medical providers to capture and share the complete patient medical record including historical information and referral information and lab results all in a secure and HIPAA compliant manner. This particular PriVapp Circle may in some cases be as small as two individuals, the patient and the medical professional. The publisher may set up this private circle in the same or similar manner provided in examples 1-3 above.

Example 5: Government Emergency and Disaster Circle

It can be beneficial for government officials or agencies to communicate directly and privately with others agencies regarding urgent matters. In this example, members of the Disaster and Emergency Services department can have SoftServ and an unpopulated PriVApp already installed on their devices. At the onset of, for example, an earthquake epicenter in town of Napa CA, Disaster Preparedness Coordinator who is the Publisher of this PriVapp circle can the PriVapp allowing for members to connect immediately. The CA Emergency Management Agency and FEMA Governor's Office of Emergency Management will then be connected on this PriVapp circle. Of course other entities may be added to this circle by the publisher if for example a certain agency needs to participate in the activities of this private circle. This PriVapp can also be set up in a manner similar to those in examples 1-3.

While the foregoing written description of the embodiments enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A system for secured communication over a private network of devices, the system comprising:
   a private network of devices comprising:
      a publisher device;
      a first member device to facilitate transfer of information through an application between a primary member device and a plurality of secondary member devices on a closed network without the use of a server outside of the primary member device and a plurality of secondary member devices;

wherein the publisher device is configured to communicate with a member device over a secure tunnel; wherein the first member device is configured to communicate with a second member device and the publisher device over a secure tunnel; wherein the second member device is configured to communicate with a first member device and a publisher device over a secure tunnel; wherein the server is configured to route offline messages between member devices and between one of the first and second member devices and the publisher device.

2. The system of claim 1, wherein the first member device and second member devices are configured to communicate private circle data with each other.

3. The system of claim 2, wherein the member and publisher devices comprise a storage medium comprising a messaging archive file.

4. The system of claim 3, wherein the system is configured to distribute messages in a first messaging archive file a first member device with messages in a second messaging archive file on a second member device.

5. The system of claim 2, wherein the member and publisher devices comprise a storage medium comprising a document revisions folder and a document file.

6. The system of claim 5, wherein the first member device is configured to view comments on a document made on the second member device.

7. The system of claim 5, wherein the system is configured to distribute documents in a first document revisions folder on a first member device with documents in a second document revisions folder on a second member device.

8. The system of claim 1, wherein the publisher and member devices comprise mobile phones, tablets, desktop computers, laptop computers or a combination thereof.

9. A system for secured communication over a private network of devices, the system comprising:
a private network of devices comprising:
a publisher device; a first member device; and a second member device; wherein the publisher device is configured to directly communicate with a member device over a secure tunnel without a relay; wherein the first and second member devices are configured to directly communicate with each other over a secure tunnel without a relay; wherein the system is configured to route offline messages between member devices and between the first member device and the publisher device, wherein the publisher device creates and publishes a private network with an application with instruction for communicating private circle information with a member device on a closed network without the use of a remote server outside of the primary member device and a plurality of secondary member devices, wherein the application comprises instructions for communicating private circle data among member devices and the publisher device.

10. A method of providing secured communication over a private network of devices, the method comprising:
receiving from a publisher a first private circle data, wherein the private circle data comprises a first member data and a second member data; providing to a first publisher device a first microserver framework; providing to the publisher device a first private circle application, wherein the first private circle application comprises instruction for communicating private circle information with a member device on a closed network without the use of a remote server outside of the primary member device and a plurality of secondary member devices;
providing to a first member device, a second microserver framework and a second private circle application; and
providing to a second member device, a third microserver framework and a third private messaging application;
wherein the microserver frameworks comprise instructions for establishing a secure tunnel between two members and between a member and the publisher;
wherein the private circle applications comprise instructions for communicating private circle data between member devices and between and member device and the publisher device.

11. The method of claim 10, wherein the microserver framework comprises instructions for communicating offline messages from a first member device to a second member device.

12. The method of claim 10, wherein the member and publisher devices comprise a storage medium comprising a messaging archive file.

13. The method of claim 10, wherein the member and publisher devices comprise a storage medium comprising a document revisions folder and a document file.

14. The method of claim 10, comprising saving in the first member device's messaging archive file an offline message sent from a first member device.

15. The method of claim 10, comprising distributing a first messaging archive file on the first member's device with a second messaging archive file on the second member's device.

16. The method of claim 10, comprising creating a new version of a first document located in the first document revisions folder of a first member's device, after the first member makes a new comment on the first document.

17. The method of claim 10, comprising distributing documents in a first document revisions folder on a first member device with documents in a second document revisions folder on a second member device.

18. The method of claim 10, further comprising assigning permissions or access levels to a document for each member of a private circle.

19. The system of claim 10, wherein the publisher and member devices comprise mobile phones, tablets, desktop computers, laptop computers or a combination thereof.

20. A method of claim 10, further comprising relaying messages between member devices through an intermediary device.

* * * * *